UNITED STATES PATENT OFFICE.

WALLACE P. GROOM, OF BROOKLYN, NEW YORK.

PROCESS OF TREATING SEED-COTTON.

SPECIFICATION forming part of Letters Patent No. 227,767, dated May 18, 1880.

Application filed March 4, 1880. (Specimens.)

*To all whom it may concern:*

Be it known that I, WALLACE P. GROOM, of the city of Brooklyn, in the county of Kings and State of New York, have invented a certain new Process of Treating Seed-Cotton Preparatory to Ginning, of which the following is a specification.

My invention consists in an improved process of treating seed-cotton before ginning by subjecting the same to heat and moisture artificially applied, whereby a portion of the oil is extracted from the seed while in the cotton and the oil so extracted diffused among the fibers, as will be more fully hereinafter set forth.

Various methods may be employed for heating the cotton in carrying out my process. I may heat it in a close room or chamber surrounded by or containing series of pipes, through which a heating agent, such as steam or hot air, is circulated, and preparatory to or at the time of heating it I sprinkle or otherwise apply to the cotton a little water, which greatly facilitates the exudation and distribution of the oil. In lieu of this method of heating and sprinkling or moistening the cotton I may place the cotton in a room filled with steam or moistened hot air; and I may, if desirable, introduce the cotton by blowing it into the upper part of said room by means of a blower and allow it to fall through the hot atmosphere to the floor.

When the cotton is heated by contact thereof with steam the addition of other moisture may be dispensed with, the cotton being sufficiently moistened by the application of the steam.

The temperature of heat applied to the cotton may be about two hundred degrees, (200°;) but, if desirable, a greater or less degree of heat may be employed.

The amount of oil which it is desirable to apply to the cotton is minute, and by obtaining the oil by exudation from the seed a smaller quantity is applied than could be applied in any other way, and is also distributed perfectly uniformly through the cotton—a result very difficult, if not impossible, to accomplish with any other means of applying the oil.

Although moisture is applied in this process either simultaneously with the heating or before such treatment, the seed is left drier after the operation is completed than before, as all the moisture artificially introduced is absorbed by the cotton, while some of the natural moisture of the seed is drawn out by the oil.

The application of heat may be continued after the application of moisture ceases, and doors or other apertures in the closed room or chamber may be opened for the purpose of ventilation, thereby facilitating the driving off of the excess of moisture developed in the process.

It is not necessary that the cotton should be entirely freed from moisture after its treatment, as a little aqueous moisture remaining in the cotton helps, rather than retards, the operation of ginning, and any excess of moisture is driven out during the passage of the cotton through the gin and during the operation of pressing the ginned cotton.

Many advantages result from my improved method of treating seed-cotton. Not only is the yield of the cotton increased, but the oiling or treatment prevents the lint from getting brittle and fluffy, in which condition it is difficult to gin, and the fiber is more or less broken up by the process, and it also enables the cotton to be worked with greater facility in the various operations to which it is subjected after ginning. The seed also, when removed by the operation of ginning, is found to be so thoroughly dried that it may be packed and stored or shipped without danger of purtrifactive fermentation.

What I claim as my invention, and desire to secure by Letters Patent, is—

The herein-described process of treating seed-cotton before ginning, the same consisting in subjecting the seed cotton to the action of heat and moisture artificially applied, substantially as described, whereby a portion of the oil is extracted from the seed while in the cotton, and the oil so extracted diffused among the fibers, as set forth.

WALLACE P. GROOM.

Witnesses:
CHANDLER HALL,
FREDK. HAYNES.